SWITCHING SYSTEM COMPRISING SEQUENTIALLY OPERATED GATING MEANS
Filed Aug. 22, 1960
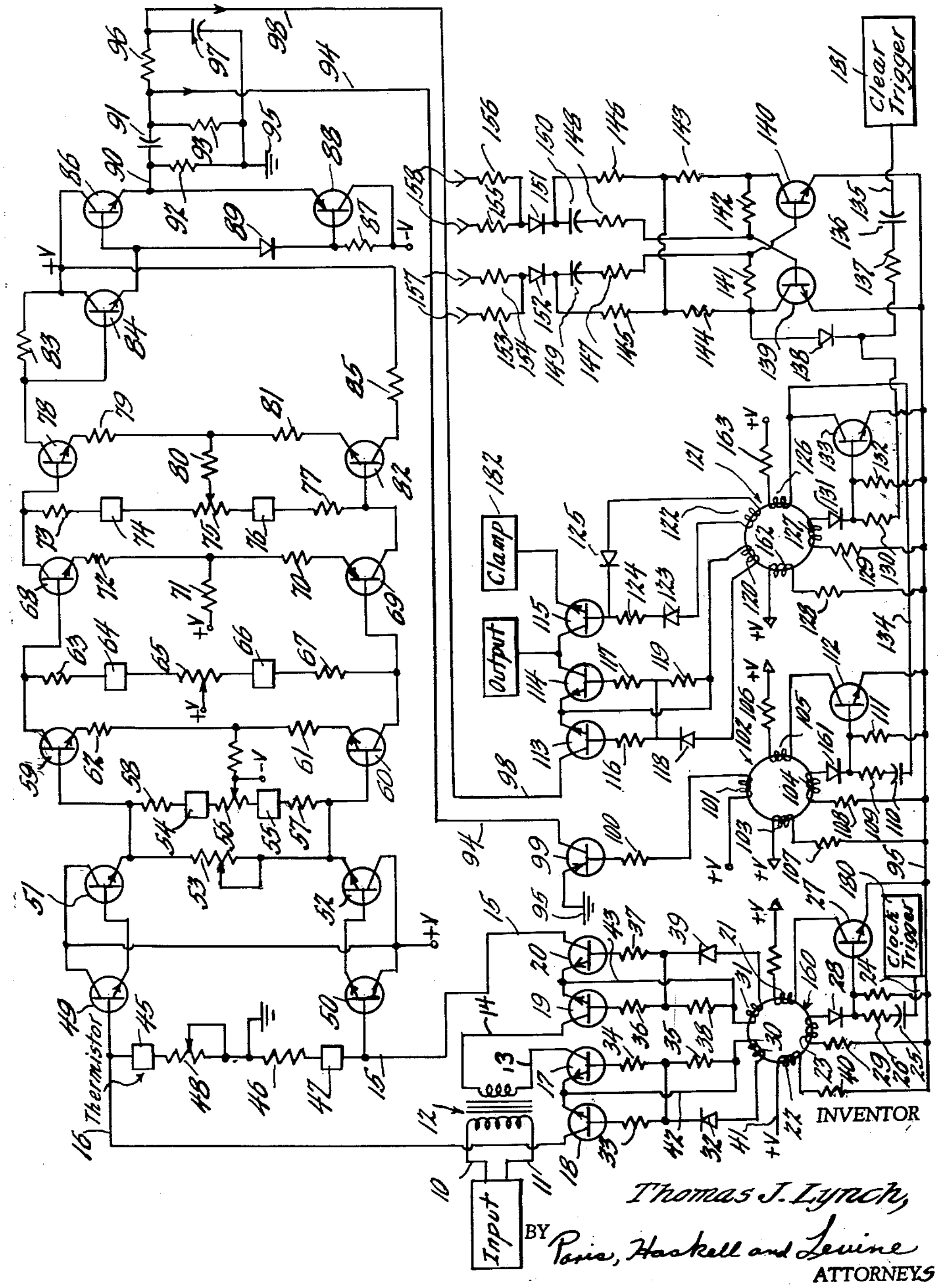
INVENTOR
Thomas J. Lynch,
BY Paris, Haskell and Levine
ATTORNEYS United States Patent Office 3,021,430

Patented Feb. 13, 1962

3,021,430
SWITCHING SYSTEM COMPRISING SEQUENTIALLY OPERATED GATING MEANS

Thomas J. Lynch, Philadelphia, Pa., assignor to Vector Manufacturing Company, Incorporated, a corporation of Pennsylvania Filed Aug. 22, 1960, Ser. No. 50,900
14 Claims. (Cl. 307—88.5)

This invention generally relates to high speed switching systems and more particularly to high speed switching and amplifying systems for commutating low level voltage signals rapidly.

In the telemetering field, for example, where it is desired to transmit information from a plurality of electrical sources in time sequence over a single transmission line on a time sharing basis, it is required that the various signals be switched onto and then disconnected from the common line quite rapidly to efficiently convey the amount of information desired. Where the signals to be commutated in this manner are low level voltage signals, in the order of millivolts, the switching problems involved become particularly acute since the switching transients are sufficiently large to normally distort the signal being transmitted as well as tending to adversely affect the signal sources and otherwise interfere with proper operation.

According to the present invention, there is provided a combined switching and amplifying system that is capable of connecting and disconnecting very low amplitude electrical signals to a common output line at a considerable speed without in any appreciable way distorting the signal being conveyed or adversely affecting either the normal operation of the source of the signal or the common transmission means and other circuits to which the signal is being conveyed.

It is accordingly a principal object of the invention to provide a high speed switching system for low level voltage signals that does not appreciably distort the signals.

A further object is to provide such a system that is comprised completely of solid state components that are small in size and light in weight.

A still further object is to provide such a system that may be repeatedly operated in rapid sequence without appreciably distorting the signal being conveyed.

Other objects and many additional advantages will be more readily understood after a detailed consideration of the following specification taken with the accompanying drawing, designated as FIG. 1 and illustrating in electrical schematic form one preferred low voltage switching and amplifying system according to the invention.

Generally according to a preferred embodiment, the system is comprised of an input switching mechanism, an amplifier, and an output switching mechanism, all being connected in cascaded relation. The input switching mechanism receives a very low voltage signal from a source, which in a telemetering application may be a transducer bridge circuit, and serves to rapidly connect and disconnect this signal to the amplifier as controlled by a repetitively operating actuator such as a clock generator.

The input signal is thus periodically applied to the amplifier for a very short interval and the amplifier, in turn, amplifies this signal and transmits the amplified signal to the output switching mechanism.

The output switching mechanism is also rapidly operated by a periodically operating generator source to briefly apply the amplified signal to the common output or bus line but according to the present invention, the output switching mechanism is not actuated in synchronism with the input switching mechanism but is rather slightly delayed to close after the input switching mechanism has been actuated. This delay prevents the transmission of undesired transients over the common output line that would introduce spurious information or noise over the output. The input switching mechanism is also opened or deenergized slightly after the opening of the output switching mechanism, again for the purpose of preventing the transmission of switching transients over the common output line when the input switching mechanism opens. Thus the input switching mechanism is operated in advance of the output switching mechanism and remains in operation until after the output switching mechanism is disengaged with the result that switching transients occurring upon closing and opening of the input mechanism cannot be transmitted over the common output line.

Since the input and output switching mechanism and the amplifier are constructed for rapid and repetitive on-off operation in telemetering applications, all of these components must be rapidly restored to their initial condition during the short time "off" periods and maintained in readiness for the transmission of the next series of data when commanded by the repetitive clock or other timing and control sources. According to the present invention, the input and output switching mechanisms are made self restoring or resetting and the amplifier is so constructed and controlled in combination with the output switching mechanism that it is rapidly reset after each actuation of the switching mechanisms.

Referring now specifically to the single figure for a detailed consideration of a preferred embodiment, the low voltage input signal is introduced over lines 10 and 11 to the primary winding of an input transformer 12 whose secondary winding is connected to a double ended input gate or input switching mechanism.

As generally indicated above, the input signal in a telemetering or like communication system is generally obtained from a bridge circuit leading from a transducer and consequently neither of input lines 10 or 11 is grounded, but rather the input is double ended. Furthermore, it is necessary to remove any direct current biasing or residual signal from the input and for this reason the transformer 12 is employed.

Both terminals from the secondary winding of transformer 12 are connected to a double ended input gate circuit over lines 13 and 14 and the output lines 15 and 16 leading from the input gate are, in turn, directed to the input terminals of the amplifier.

The double ended input gate comprises a pair of transistors connected in series between each of input lines 13 and 14 and output lines 15 and 16, with transistors 17 and 18 being connected between input line 13 to the gate and output line 16 to the amplifier and transistors 19 and 20 between gate input line 14 and output line 15. Both pairs of transistors 17, 18 and 19, 20 are simultaneously rendered conductive and non-conductive by means of pulses directed to their base elements and originating from a saturable magnetic core 160 having a square hysteresis loop characteristic.

Considering the input gate circuit in greater detail, the saturable magnetic core 160 is provided with an input winding 21, a resetting winding 22, and a regenerative feedback winding 23. To trigger the gate into closed condition, a control or clock impulse received over line 24 from a clock trigger or generator 180 is directed through capacitor 25 and resistor 26 to energize the base element of transistor 27 rendering the transistor 27 conducting from its collector to emitter elements and permitting current flow through input winding 21. The current flow through input winding 21 produces a change in flux in the core 160 that induces a voltage in feedback winding 23 in a direction to maintain transistor 27 conducting and thus enable continued current to flow through input winding 21. This feedback condition is progressive whereby this saturating operation continues after the clock pulse over line 24 has disappeared until the magnetic core 160 has been fully saturated. As a result, a small triggering impulse of short duration is sufficiently amplified by transistor 27 and windings 21 and 23 in such manner as to reverse the direction of saturation of core 160.

A pair of output windings 30 and 31 are provided on the core 160 and are each connected to a different pair of the gate transistors 17, 18 and 19, 20; with winding 30 being connected to energize the base elements of transistors 17, 18 and winding 31 being connected to the base elements of transistors 19 and 20. Consequently, as the core 160 is progressively saturated in response to the triggering input or clock pulse over line 24, the change of flux induces a constant volt-time impulse over each of output windings 30 and 31 which constant pulse is employed to render each of transistors 17, 18, 19, and 20 conducting and enable the input signal over lines 13 and 14 to pass through the related pair of gate transistors and pass upwardly to the input lines 15 and 16 leading to the amplifier.

As the core 160 becomes fully saturated in the reverse direction, the transistor 27 becomes nonconducting and the output windings 30 and 31 on the core 160 are deenergized to render the gate switching transistors 17, 18 and 19, 20 nonconducting, thereby to automatically open the input gate and disconnect the input signal over lines 13 and 14 from the amplifier terminals.

The input gate is thereafter automatically reset to condition the input gate for the next clock pulse by the operation of resetting coil 22. Resetting coil 22 is continuously energized by a direct current biasing source over line 41 to maintain or restore the core 160 in its original state of saturation. During the operation of the gate in response to a clock pulse over line 24 as described above, the regenerative feedback provided by windings 21 and 23 is sufficient to overcome the effect of resetting winding 22 and thereby drive the core 160 to saturation in the reverse direction. Upon reaching saturation in the reverse direction, however, the windings 21 and 23 are deenergized whereby the resetting winding 22 gains control, to again restore the core 160 to its initial state of saturation. Thus the input gate circuit closes for a predetermined short time interval upon receiving each clock impulse over line 24 enabling the input signal over lines 13 and 14 to be directed to the amplifier, and thereafter automatically opens and is automatically reset awaiting the next succeeding timing or clock pulse.

When the input gate circuit is open, the switching transistors 17, 18 and 19, 20 provide an extremely high impedance in series with lines 13 and 14 whereby the terminals of the secondary winding of input transformer 12 are effectively open circuited. Thus the transformer 12 cannot retain or store any energy between successive operations of the input gate that might block or otherwise distort or interfere with the transmission of the low level input signal from lines 10, 11 to the amplifier terminals and enables the switching of the low level input signal quite rapidly without blocking or intermodulating effects.

The amplifier circuitry according to the invention is also constructed in such manner that the signal may be rapidly and repetitively applied thereto for short intervals of time and then abruptly disconnected, with the amplifier performing its amplifying function during this short interval that the signal is applied and thereafter being restored to its original state during the intervening interval awaiting the next application of the input signal. The amplifier is also temperature compensated to prevent changes in temperatures from affecting its proper functioning, and it is also impedance matched and balanced both at input and output with the input and output gating mechanism to provide maximum gain without distortion compatibility with the rapid switching of the input and output gating mechanism.

Returning to the drawing for a detailed consideration of the amplifier, the circuit is preferably constructed of seven direct current coupled stages, with the first five stages thereof being differentially constructed of a pair of transistors to minimize drift characteristics, and the remaining two stages being connected to convert the differential output therefrom into a balanced single ended output that is impedance matched to the output gate.

The input signal on lines 15 and 16 to the amplifier is initially applied across a pair of series connected elements including a thermistor or other temperature variable impedance 45 and a resistor 48 in series with a second resistor 46 and a second thermistor 47. The ground or common return 95 is applied at the junction of resistors 48 and 46 whereby the input signal voltage drop across thermistor 45 and resistor 48 is always maintained in opposite phase relation with the voltage drop across thermistor 47 and resistor 46 to apply differential voltage input signals to the amplifier.

The purpose of thermistors 45 and 47 in this input network is to compensate for the varying characteristics of the transistors in the first and second stages due to temperature change and thereby to maintain the signal being transmitted by these stages constant despite variation in temperature.

The differential input voltages developed across the input network are then applied to the base elements of transistors 49 and 50 in the first stage, which transistors 49 and 50 are connected as emitter-follower amplifiers to energize the base elements of transistors 51 and 52 of the second stage. The first stage transistors 49 and 50, therefore, function to impedance couple the input signal with the second stage transistors of the amplifier.

The second stage transistors 51 and 52 are also connected as a differentially functioning cathode follower circuit having their emitter elements energizing opposite terminals of a resistor 53, across which the impedance coupled input signal is developed.

The voltage signal across resistor 53 is next amplified by three stages of amplification, including transistors 59 and 60 in the third stage; transistors 68 and 69 in the fourth stage; and 78 and 82 in the fifth stage. In each of these stages there is also provided a pair of thermistors or other temperature variable elements comprising elements 54, 55; 64, 66; and 74, 76 all for the purpose of maintaining the amplifier characteristics substantially insensitive to temperature variation over a wide range.

After differential amplification by the third, fourth, and fifth stages; the output from the fifth stage, and developed at the collector elements of transistors 78 and 82, is reconverted to a single ended signal by an emitter follower connected transistor 84 feeding what is known as a complementary symmetry emitter follower circuit including transistors 86 and 88.

The emitter follower connected transistor 84 is connected to the output of transistor 78 and consequently only one half of the differential output of the fifth stage is employed. The signal from the emitter element of transistor 84 is thence transmitted jointly to the base elements of transistors 86 and transistor 88, which are, in effect, connected in parallel or in common to energize line 90. Transistor 86 is energized at its collector with a positive source of voltage and transistor 87 is energized at its collector with a negative source of voltage. Consequently, the pair of transistors 86 and 88, severally, transmit either positive or negative excursions of the signal to line 90 thereby to symmetrically convert the doubled ended amplifier signal to a single ended signal on line 90.

As thus far described, therefore, the low level input signal is impedance matched and amplified by a system that is substantially insensitive to temperature change and is compensated against drift. This amplifier is also of the direct current coupled variety whereby the output signal from each stage is directly coupled to the next stage without passing through a coupling capacitor or the like. The reason for this direct coupling of the stages is to eliminate the need for any impedance coupling elements between stages, such as a capacitor, which might retain a small charge in between switching operations and either block the transmission of the next intelligence signal passing through the amplifier or bias the intelligence signal with a steady state error due to any such residual charge maintaining. With the directly coupled amplifying system, on the other hand, signals may be rapidly applied to and disconnected from the amplifier, with the amplifier rapidly returning to its original condition in the interval between successive operations of the input gate circuit.

The amplified signal from the last stage of the amplifier is then directed over line 90 to a filtering network including a series capacitor 91 that functions to remove any direct current component from the signal but permits the alternating current component to pass therethrough and through resistor 96 to the filter output line 98. Thus any residual direct current component being produced in the gate or amplifier is trapped on capacitor 91 and prevented from passing over line 98 to the output gate circuit.

The output gate circuit is quite similar to the input gate circuit in construction and includes a saturable core 121 having substantially square hysteresis loop characteristics together with a plurality of windings thereon for input, output and control purposes. The input winding 126 is energized by a potential source and in series with the collector-emitter elements of transistor 133 and the feedback winding 127 controls the conduction of the transistor 133 by energizing its base to emitter elements. The energized reset winding 162 restores the core 121 to its original state of saturation in the intervals between successive operations of the gate in the same manner as in the input gate circuit, and the output windings 120 and 122 control transistors 113, 114, and 115 to function as switching elements.

The functioning of the output gate, however, differs from the input gate in that the closing of the gate is delayed to occur slightly after closing of the input gate and the opening of the output gate is in advance of the opening of the input gate all for the purpose of preventing switching transients from passing outwardly over the common output or bus line. More specifically, the output gate is triggered into closed operation slightly after the input gate has been closed and both gates thereafter remain closed for a short interval of time until first the output gate is opened and after a short time interval the input gate then opens. This time delayed action prevents any transients being generated upon closing or opening of the input gate from being passed through the output gate and introducing an error over the common "output" or bus line.

Returning to the drawing, the output gate is first primed or readied for operation by means of a bias voltage applied by a flip-flop circuit and through resistor 130 to the base element of transistor 133. After being biased in this manner, the next triggering pulse being generated by the clear trigger 181 and passed over line 135 is applied to the base element of transistor 133, rendering the transistor 133 conducting and permitting current flow through input winding 126. This induces a feedback signal in coil 127 to maintain transistor 126 conducting, and this operation progresses until core 121 is fully saturated whereupon the output gate opens. During this progressive saturation of core 121, a voltage is also induced in output coil 120. The output voltage from coil 120 renders switching transistors 113 and 114 conducting which enables the amplifier output signal over line 98 to pass to the common output or bus line labeled "output." Slightly after the core 121 has become saturated, a voltage is induced in winding 122 rendering switching transistor 115 conducting which enables a bias or clamping voltage from clamp 182 to be simultaneously applied to the "output." This clamping of the output is timed to occur immediately upon the output gate opening thereby to rapidly restore the potential at the output line to its original condition and prevent the storage of a residual signal due to any reactance in the output line circuitry. More specifically, the reason for the application of a clamp to the "output" is the fact that the common bus or "output" is adapted to sequentially receive different signals from a plurality of output gates in the system with some being of lower level than the others. Consequently, it is necessary to rapidly restore the potential on the "output" line to its initial condition in the short time interval between successive operations of the different gate circuits. In the absence of a clamping signal on the other hand, stray capacitance and reactance in the output bus line would prevent the voltage thereon from decaying rapidly and introduce an error or bias affecting the next signal being transmitted by the next succeeding output gate circuit.

The clear trigger pulse being produced by clear trigger generator 181 is delayed in time from the clock pulse originating from clock trigger 180 and controlling the operation of the input gate. Consequently as indicated above, the input gate is first closed to admit the low level signal from input lines 10 and 11 into the amplifier and after any switching transients have decayed, the output gate is closed to transmit the amplified input signal to the common bus or "output."

After the output gate has opened, and next the input gate has opened, the system is then restored to its original condition in preparation for the next switching cycle. As noted above, the input and output gates are made self restoring by the functioning of the resetting windings 22 on core 160 and winding 162 on core 121. However, it is necessary to restore the amplifier to its original condition by removing any bias voltages or blocking voltages that may remain in the amplifier after the completion of operation by the output and input gates.

The amplifier is preferably constructed with direct current intrastage and interstage coupling so that the amplifier per se possesses no reactance that might retain a residual charge or voltage in the intervals between successive switching of the input and output gates. However, as will be recalled, capacitors 91 and 97 are provided in the output filter leading from the amplifier for the purpose of removing any direct current components from the signal being amplified. Consequently these capacitors 91 and 97 may retain a charge or voltage which must be clamped or eliminated.

To discharge these capacitors 91 and 97, there is provided a second output gate that functions to clamp these potentials during the brief time intervals between operation of the input and output gates. Returning to the drawing, the right hand terminal to capacitor 91 is connected over line 94 to the collector element of a switching transistor 99 in the second output gate. The emitter element of transistor 99 is grounded, as shown, whereby when switching transistor 99 is made conducting by operation of the second output gate, the right hand terminal of capacitor 91 is placed at ground potential.

The switch transistor 99 is part of the second gate circuit and is triggered by means including a satrable core 102 that functions in essentially the same manner as the input and output gates as described above. The other components of this gate circuit are the same as those previously described, and include an input winding 105, a feedback winding 104, a reset winding 103 and an output winding 101 energizing the base-emitter elements of transistor 99.

The triggering signal for operating the second output gate is taken from the collector element of transistor 133 in the first output gate and is, therefore, transmitted in time delayed relation immediately after each operation of the first output gate. More specifically, during each operation of the first output gate, the transistor 133 is maintained conducting and the potential at the collector element thereof is at a low positive potential until the core 121 becomes fully saturated and the first output gate thereupon opens. At this time, the transistor 133 is abruptly rendered non-conductive and the potential at its collector rises rapidly. This rapid change in positive potential is transmitted over line 134 and through capacitor 110 and resistor 109 to the base element of transistor 112 thereby triggering transistor 112 into conduction and initiating the closing of the second output gate. The switch transistor 99 is thus rendered conductive after the first output gate has opened to clamp the potential on capacitors 91 and 97 and restore these capacitors to their original condition. The second output gate is also self resetting in the same manner as the input and first output gates whereby after the capacitors 91 and 97 have been clamped, the switch transistor 99 is automatically opened, the saturable core 102 is reset, and the system is again ready for the next succeeding clock trigger from 180 to commence the overall switching operation again.

Recapitulating briefly the overall operation of the system, upon receiving an initiating triggering impulse from clock trigger 180, the input gate is closed to admit the low level input intelligence signal to the amplifier where this signal is amplified. A short time thereafter, after the input transients have substantially decayed, the output gate is closed in response to a trigger initiated by the clear trigger generator 181 thereby to transmit the amplified intelligence signal through the output gate and onto the common "output" or bus line. In the final steps, the output gate automatically opens to disconnect the intelligence signal from the common bus line or "output" and the opening of this output gate initiates a clamp to rapidly restore the potential on the output bus to its original value and also initiates the triggering of a second ouput gate to clamp the filter capacitors 91 and 97 thereby completing the resetting of the system in preparation for the next repetition of the switching cycle.

The additional flip-flop circuit, including transistors 139 and 140, is for the purpose of independently controlling the application of signals from the output gate to the common bus or "output."' The transistors 139 and 140 are connected in feedback fashion with the collector element of transistor 139 being connected to the base of transistor 140 through resistor 141 and with the collector element of transistor 140 connected to the base element of transistor 139 through resistor 142. These elements are also suitably energized and biased to provide two stability states with one of the transistors always rendered conducting and the other nonconducting. This stability condition is controlled by the inputs at any of terminals 157 and 158 whereby a start pulse received at any of terminals 158 renders transistor 140 conducting and transistor 139 nonconducting, and a stop pulse at any of terminals 157 renders transistor 139 conducting and transistor 140 nonconducting. When transistor 139 is rendered nonconducting after a start pulse is received, the high potential at its collector element is coupled through diode 138 and resistor 130 to the base of transistor 133 to bias and condition or ready the output gate for operation. Consequently the next clear pulse from clear trigger 181 triggers the output gate closed. On the other hand, a stop pulse being applied to any of terminals 157 renders transistor 139 conducting, lowering the potential at its collector element, and removing the bias voltage from the output gate. The output gate therefore does not respond to the clear triggers from 181 and the switching system is effectively disabled.

Although but one preferred embodiment of the invention has been illustrated and described, it is believed evident that many changes may be made by those skilled in the art and this invention should be considered as being limited only by the following claims.

What is claimed is:

1. In a high speed switching system for rapidly applying and disconnecting signals from an input line to an output line, an input gate for receiving the signals from the input line and being actuable to close the gate and transmit said signals, said input gate including a time delay means for automatically opening the gate after a given time interval after each actuation, an output gate for receiving said transmitted signals and being actuable to close the gate and convey said signals to said output line, said output gate including a shorter time delay means than said input gate for automatically opening after a shorter time interval after each actuation, and means for sequentially actuating first the input gate and thereafter the output gate whereby said input gate is opened before the output gate and automatically closed after the output gate.

2. In a high speed switching system, an input and output gate in cascaded relationship, each gate being independently actuable to close and automatically time delayed to open at fixed time intervals after each closure, and with the input gate having a longer time delayed interval than the output gate, means actuating said gates in time sequence whereby the input gate closes in advance of the output gate and automatically opens after the output gate opens, and means responsive upon opening of the output gate for restoring the potentials in the switching system to their initial value.

3. In the system of claim 2, a control means for the output gate for selectively rendering the output gate responsive to actuation and unresponsive to actuation.

4. In the system of claim 3, said actuating means for said gates being repetitively operating at high speed and said control means being independently energized to selectively render said output gate responsive and unresponsive to said repetitively operating actuating means.

5. The switching system of claim 4 including in addition an amplifier intermediate the input and output gates, said amplifier including a direct current filter, and means responsive to each opening of the output gate for clamping the filter.

6. In the system of claim 4, said input and output gates being selectively closable and openable to interconnect an input line with a common output bus, and an additional clamp means energizable upon each opening of the output gate to clamp the common output bus to a fixed potential.

7. In a high speed switching system for selectively interconnecting an input line to a common bus, an input gate, an output gate, and an amplifier intermediate the gates, each gate being energizable to close and automatically operating to open after a given time delay, with the input gate having a longer time delay than the output gate, means for applying energization to the gates in sequence with the input gate being first to close and last to open thereby to eliminate the transmission of transients over the common bus upon closing and opening of the input gate, means responsive to opening of the output gate for applying a fixed clamping potential to the output bus, said amplifier having a filter for preventing transmission of a direct current signal over the bus, and means responsive after opening of the output gate for applying a fixed clamping potential to said filter.

8. In the switching system of claim 7, said gates each including a switching transistor and a saturable core having a substantially square hysteresis loop characteristic for controlling the conduction and non-conduction of the transistor, and regenerative feedback means for reversing the state of saturation of the core responsively to a trigger signal.

9. In a high speed switching system for low level alternating signals, an independently operating input and output gate for respectively receiving the signals and transmitting the signals, an amplifier intermediate the input and output gates for amplifying the signal received from the input and conveying the amplified signal to the output, and means for actuating said input and output gates in overlapping time sequence whereby switching transients occurring upon closing and opening of the input gate are blocked from passing through the output gate, a filter means associated with the amplifier for preventing the passage of direct current throughout the output gate, and means responsive after actuation of the gates for clamping the filter to a fixed potential and clamping the output to a fixed potential.

10. In the system of claim 9 said input and output gates each including a transistor, a saturable core having substantially square hysteresis characteristics, a regenerative control means for the core for reversing its condition of saturation responsively to an actuating trigger signal, and an energizable resetting winding for restoring the core to its initial state of saturation.

11. In a high speed switching system for selectively connecting and disconnecting an input line to a common bus, the combination of an input switch means, an amplifier, and an output switch means, means for applying periodic energization to said input and output switch means in time sequence to repetitively close said switch means in time delayed relationship, said switch means being automatically opened after each energization in the reversed time delayed relationship whereby transients occurring upon closing and opening of the input switch means are blocked from passage through the output switch means, and control means for the output switch means for selectively conditioning and disabling said output switch means to respond to said periodic energization.

12. In the switching system of claim 11, said amplifier being direct current coupled to prevent the storage of error direct current signals between successive operations of the switching system, a direct current filter for said amplifier for blocking the passage of direct current signals through the output switch means, and means responsive after each successive operation of the switch means to briefly clamp said filter to a fixed potential and to briefly clamp said common bus to a fixed potential.

13. In a high speed switching system for periodically connecting an input line to an output line for brief time intervals, a periodically operating input switch means, a direct current coupled amplifier connectable and disconnectable to the input line through said input switch means, a filter for blocking the passage of direct current signals through the input switch means, an output switch means for interconnecting the amplifier with the output line, means for applying repetitive actuating signals to the input and output switch means in time delayed relationship, means for selectively conditioning and disabling said output switch means to respond to said periodic actuating signals responsively to a control signal, and clamping means responsive after each successive actuation of the output switch means for applying a fixed potential to said filter and clamping means for applying a fixed potential to said output line after each actuation of the output switch means.

14. In the system of claim 13, said switch means including an electron valve and a controlling core having substantially square hysteresis characteristics, and said output line clamping means including an electron valve being energized by said core after said electron valve switching means controlled by said core is deenergized.

References Cited in the file of this patent

UNITED STATES PATENTS

| | | |
|---|---|---|
| 2,640,151 | Dill | May 26, 1953 |
| 2,866,092 | Raynsford | Dec. 23, 1958 |